(12) United States Patent  
Horspool et al.

(10) Patent No.: US 11,966,295 B2  
(45) Date of Patent: Apr. 23, 2024

(54) CAPACITOR ENERGY MANAGEMENT FOR UNEXPECTED POWER LOSS IN DATACENTER SSD DEVICES

(71) Applicant: Kioxia Corporation, Tokyo (JP)

(72) Inventors: Nigel Horspool, Abingdon (GB); Steve Wells, San Jose, CA (US)

(73) Assignee: KIOXIA CORPORATION, Tokyo (JP)

( * ) Notice: Subject to any disclaimer, the term of this patent is extended or adjusted under 35 U.S.C. 154(b) by 35 days.

(21) Appl. No.: 17/826,992

(22) Filed: May 27, 2022

(65) Prior Publication Data

US 2022/0291997 A1 Sep. 15, 2022

Related U.S. Application Data

(63) Continuation of application No. 17/035,021, filed on Sep. 28, 2020, now Pat. No. 11,347,593, which is a continuation of application No. 15/917,387, filed on Mar. 9, 2018, now Pat. No. 10,789,130.

(51) Int. Cl.  
*G06F 11/14* (2006.01)

(52) U.S. Cl.  
CPC ...... *G06F 11/1441* (2013.01); *G06F 11/1435* (2013.01)

(58) Field of Classification Search  
CPC ............ G06F 11/1441; G06F 11/1435  
USPC ................................................ 714/22  
See application file for complete search history.

(56) References Cited

U.S. PATENT DOCUMENTS

| | | |
|---|---|---|
| 5,485,595 A | 1/1996 | Assar et al. |
| 9,448,896 B2 | 9/2016 | Gaertner et al. |
| 10,789,130 B1 | 9/2020 | Horspool et al. |
| 2009/0259799 A1 | 10/2009 | Wong |
| 2010/0281340 A1 | 11/2010 | Franceschini et al. |
| 2014/0281661 A1 | 9/2014 | Milton et al. |
| 2015/0193302 A1* | 7/2015 | Hyun .......... G11C 29/028 714/764 |
| 2015/0248249 A1 | 9/2015 | Amidi et al. |
| 2017/0060436 A1* | 3/2017 | Trika .......... G06F 3/0656 |
| 2018/0089081 A1 | 3/2018 | Ramalingam |
| 2018/0261281 A1 | 9/2018 | Moschiano et al. |
| 2019/0188589 A1 | 6/2019 | Ponnuru et al. |
| 2019/0272872 A1 | 9/2019 | Moschiano et al. |

* cited by examiner

*Primary Examiner* — Yair Leibovich  
(74) *Attorney, Agent, or Firm* — Foley & Lardner LLP

(57) ABSTRACT

Various implementations described herein relate to systems and methods for a Solid State Drive (SSD) to manage data in response to a power loss event, including writing data received from a host to a volatile storage of the SSD, detecting the power loss event before the data is written to a non-volatile storage of the SSD, storing the write commands to a non-volatile storage of the SSD, marking at least one storage location of the SSD associated with the write commands as uncorrectable, for example, after the power is restored.

20 Claims, 9 Drawing Sheets

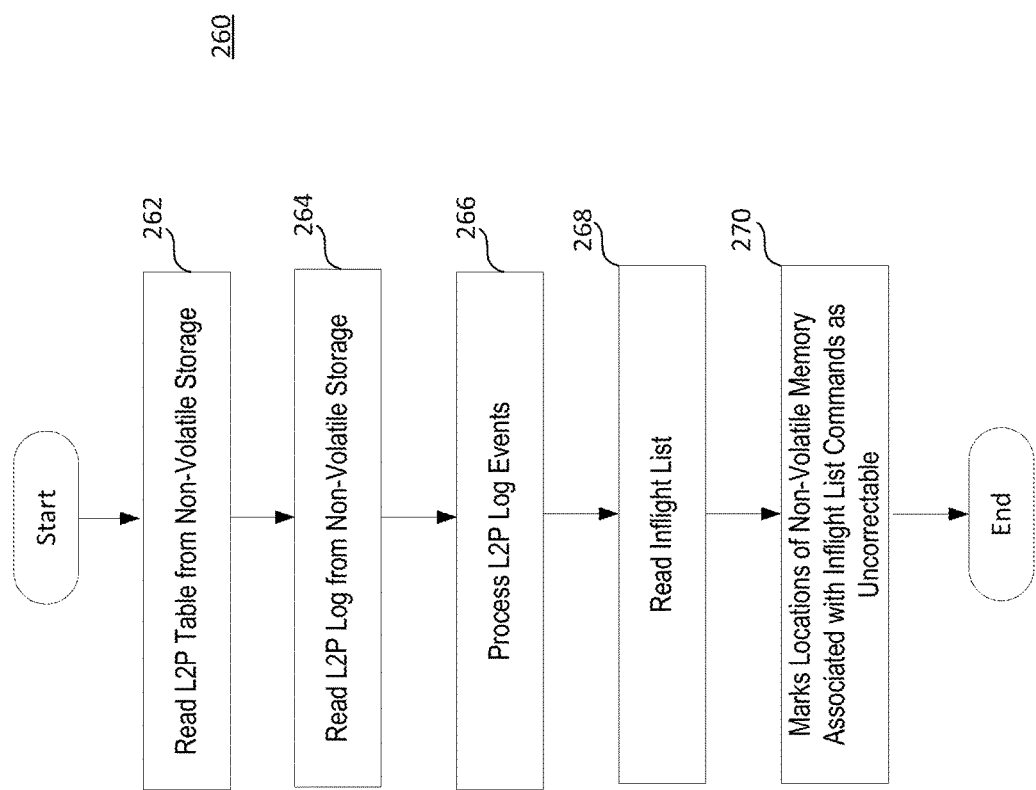

| Logical Address | Physical Address | Status Indicator |
|---|---|---|
| Logical Address A | Physical Address A | Uncorrectable |
| Logical Address B | Physical Address B | Normal |
| Logical Address C | Physical Address C | Uncorrectable |
| Logical Address D | Physical Address D | Normal |
| Logical Address E | Physical Address E | Uncorrectable |
| Logical Address F | Physical Address F | Uncorrectable |
| Logical Address G | Physical Address G | Uncorrectable |
| Logical Address H | Physical Address H | Normal |

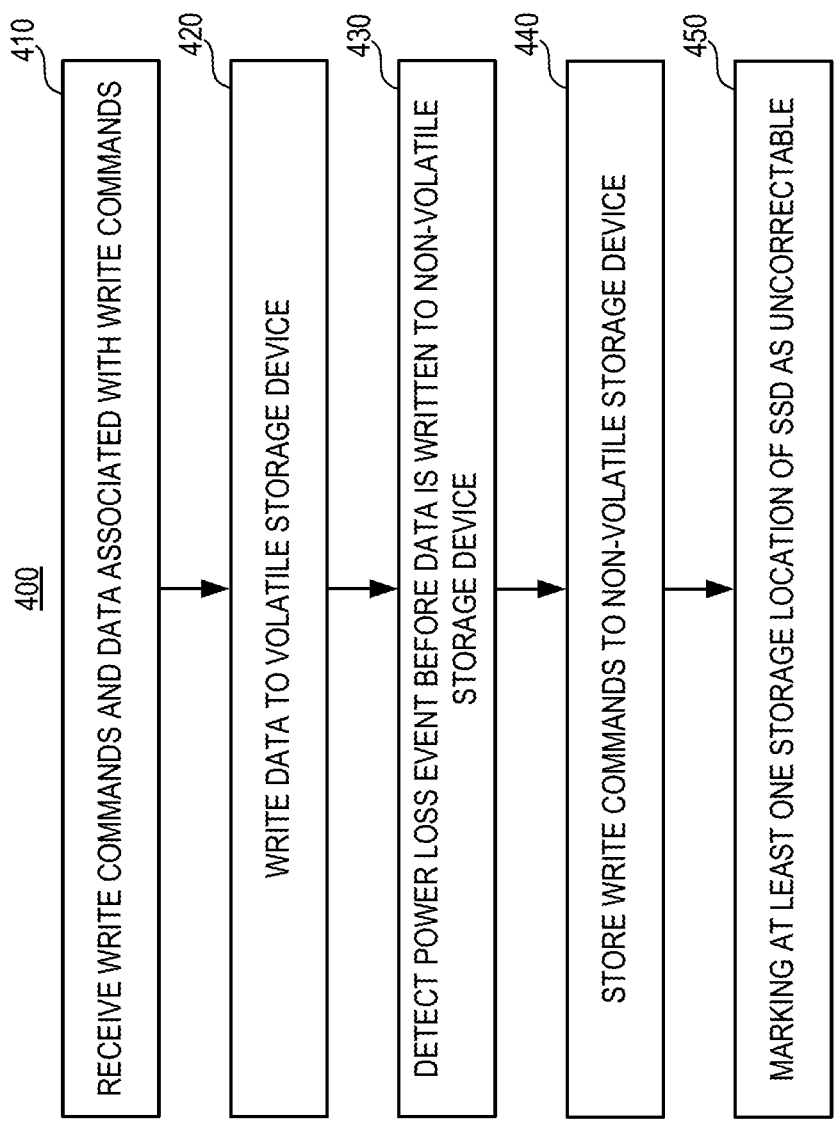

CAPACITOR ENERGY MANAGEMENT FOR UNEXPECTED POWER LOSS IN DATACENTER SSD DEVICES

CROSS-REFERENCE TO RELATED APPLICATIONS

The present application is a continuation of U.S. patent application Ser. No. 17/035,021 filed Sep. 28, 2020, which is a continuation of U.S. patent application Ser. No. 15/917, 387 filed Mar. 9, 2018, now U.S. Pat. No. 10,789,130, the contents of which are incorporated herein by reference in their entirety.

TECHNICAL FIELD

The present disclosure generally relates generally to systems and methods for improving data integrity of Solid State Drives (SSDs) responsive to a sudden, unexpected power loss.

BACKGROUND

A conventional datacenter Solid State Drive (SSD) receives write commands and associated data from a host and acknowledges the write commands to the host responsive to writing the data to a volatile storage or another suitable temporary buffer of the SSD. A controller of the SSD can write the data stored in the volatile storage to a non-volatile storage (e.g., NAND memory devices) of the SSD. Once writing the data to physical addresses of the non-volatile storage is complete, the controller updates mapping between logical addresses associated with the data and the physical addresses identifying the physical locations, for example, in a Logical to Physical (L2P) mapping table, herein referred to as a L2P table Once that is completed, the data is no longer considered to be inflight.

However, responsive to detecting a sudden, unexpected power loss, a conventional SSD uses energy stored in Power-Loss-Protection (PLP) capacitors to write the inflight data (stored in the volatile storage and not yet transferred to the non-volatile storage) to a non-volatile storage of the SSD. In other words, the PLP capacitors function as backup batteries for the SSD.

The PLP capacitors may not have sufficient power to write all of the inflight data stored in the volatile storage to the non-volatile storage. As a result, some inflight data that has not been written to the non-volatile storage may be lost. In such situations, given that the SSD has already acknowledged the write commands to the host, the SSD may provide "out-of-date" data to the host responsive to the host requesting to read the lost data. Providing out-of-date data to the host is unacceptable to datacenter customers.

Furthermore, the PLP capacitors are costly components that can occupy a considerable amount of space in SSDs. In addition, the PLP capacitors are additional points of failure. As NAND technology improves, an amount of inflight data can increase significantly, demanding even more PLP capacitors to safeguard data integrity of the inflight data.

SUMMARY

In certain aspects, the present implementations of a SSD device are directed to systems and methods for improving data integrity and reducing cost and space associated with PLP capacitors, including but not limited to, receiving, from a host, write commands and data associated with the write commands, writing the data to a volatile storage of the SSD, detecting a power loss event before the data is written to a non-volatile storage of the SSD, storing the write commands to a non-volatile storage of the SSD, and marking at least one storage location of SSD associated with the write commands as uncorrectable.

BRIEF DESCRIPTION OF THE FIGURES

FIG. 2E shows a flow chart of a process for a SSD device to handle recovery from a power loss event, according to some implementations;

FIG. 3 shows a schematic representation of a L2P mapping table, according to some implementations; and FIG. 4 shows a flow chart of a process for a SSD device to manage data in response to a power loss event, according to some implementations.

DETAILED DESCRIPTION

Among other aspects, Applicant recognizes that conventional SSD devices have data integrity issues in relation to sudden, unexpected power loss events because the energy provided by the PLP capacitors may be insufficient for writing all inflight data to a non-volatile storage. This can result in the SSD devices providing out-of-date data to the host after power is restored. Furthermore, addressing the above issues by adding additional PLP capacitors to provide additional backup energy can be costly and space-inefficient while introducing additional points of failure.

Arrangements described herein relate to systems, apparatuses, methods, and non-transitory computer-readable media to ensure that out-of-date data is not provided by an SSD device to a host following an unexpected power loss. For example, a list of inflight write commands (but not the inflight data) can be stored in a non-volatile storage using the energy stored in the PLP capacitors, responsive to detecting a sudden, unexpected power loss. The SSD firmware marks all SSD storage locations associated with the stored inflight write commands as uncorrectable upon the next power-up. As the inflight data may not be stored, the amount of information (e.g., the inflight write commands) to be stored in the non-volatile storage can be reduced significantly (e.g., by a factor of approximately 500), which leads to a commensurate reduction in need for backup power (e.g., energy provided by the PLP capacitors). It follows that the number and/or size of PLP capacitors can be likewise reduced. Therefore, such arrangements can further improve cost and space associated with the PLP capacitors.

As used herein, "inflight data" refers to data received from the host that is stored in the volatile storage of an SSD device but is not yet copied to a non-volatile storage (e.g., NAND) of the SSD device when a power-loss event occurs.

As used herein, an "inflight write command" refers to a write command received from the host, where the write command is associated with some inflight data. Responsive to detecting a power-loss event, the inflight write commands or description of the inflight write commands can be stored in a non-volatile storage of the SSD device.

Figure 1:
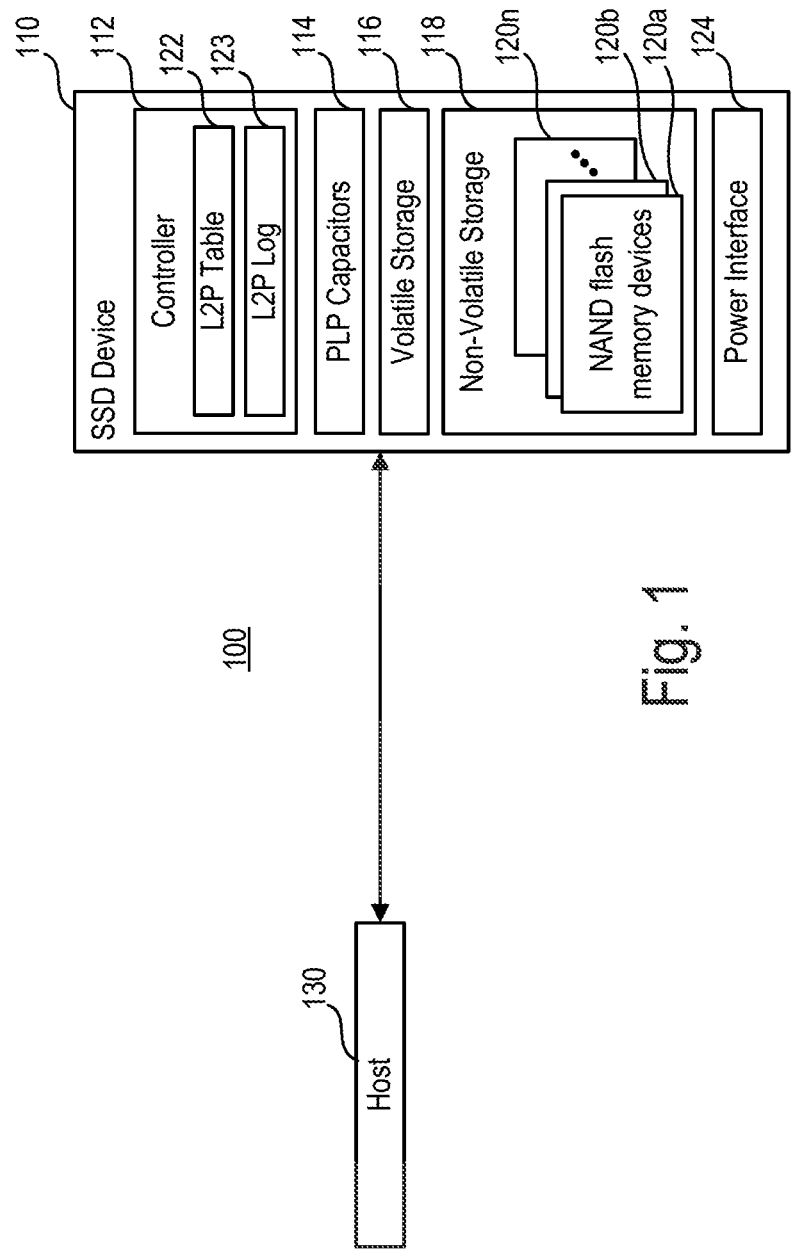
FIG. 1 shows a block diagram of a host and an SSD device, according to some implementations.

To assist in illustrating certain aspects of the present implementations, FIG. 1 shows a block diagram of a system 100 including a host 130 and an SSD device 110, according to some implementations. In some arrangements, the host 130 and SSD device 110 is part of a datacenter (not shown for brevity). The data center includes a plurality of platforms, each of which supports a plurality of hosts such as host 130 and SSD devices such as but not limited to, the SSD device 110.

The platforms may include computer nodes with internal storage, Just a Bunch Of Flash (JBOF) as storage nodes, or both. In some examples, the platforms may correspond to at least one rack or pod populated with a plurality of computing nodes (running applications), a plurality of storages (maintaining data), or a combination thereof. The computing nodes can run applications such as Non-Structured Query Language (NoSQL) databases. The storages can include Non-Volatile Memory (NVM) devices that maintain data, typically NAND flash memory, but examples of other non-volatile memory technologies include, but are not limited to, Magnetic Random Access Memory (MRAM), Phase Change Memory (PCM), Ferro-Electric RAM (FeRAM) or the like. Regardless of whether the platform employs a computer nodes architecture, a JBOF architecture, or both, the platform can serve one or more applications with a given workload using the SSD devices such as but not limited to, the SSD device 110.

In some implementations, the SSD devices within a platform are connected to a Top of Rack (TOR) switch and can communicate with each other via the TOR switch or another suitable intra-platform communication mechanism. In some implementations, at least one router may facilitate communications among the SSD devices in different platforms, racks, or cabinets. The at least one router may facilitate communications between the SSD device 110 and the host 130.

The SSD device 110 includes a controller 112, PLP capacitors 114, volatile storage 116, non-volatile storage 118, and a power interface 124. As shown, the non-volatile storage 118 includes NAND flash memory devices 120a-120n. The NAND flash memory devices 120a-120n are flash memory and include one or more individual NAND flash dies, which are NVMs capable of retaining data without power. Thus, the NAND flash memory devices 120a-120n refer to a plurality of NAND flash memory devices or dies within the SSD device 110.

The controller 112 can combine raw data storage in the plurality of NAND flash memory devices 120a-120n such that those NAND flash memory devices 120a-120n function like a single storage. The controller 112 can include microcontrollers, buffers, error correction functionality, FTL and flash interface modules, software, and firmware for implementing such functions. In some embodiments, the software/firmware can be stored in non-volatile storage 118 or in any other suitable computer readable storage medium.

The controller 112 includes suitable processing and memory capabilities for executing functions described herein, among other functions. As described, the controller 112 manages various features for the NAND flash memory devices 120a-120n including, but not limited to, I/O handling, reading, writing, erasing, monitoring, logging, error handling, garbage collection, wear leveling, logical to physical address mapping, and the like. Thus, the controller 112 provides visibility to the NAND flash memory devices 120a-120n and FTLs associated thereof.

In addition, the controller 112 may facilitate data migration from the SSD device 110 to another SSD device by communicating with a controller associated with another SSD device via the TOR switch. Moreover, the controller 112 may facilitate data migration from the SSD device 112a to another SSD device in another platform by communicating with that platform via the router.

The controller 112 (e.g., a Flash Translation Layer (FTL_interface module) may store a L2P table 122. The L2P table 122 may be a mapping table that keeps records of the correspondence between logical addresses and physical addresses. For example, the L2P table 122 can translate read and write commands (received from the host 130) with respect to logical blocks into low-level commands associated with corresponding physical blocks. In some examples, a read or write command received from the host 130 includes at least a Logical Block Address (LBA). The LBA is a logical address that identifies a logical block, which may be a region in a sector. In some examples, the write command may also include a number of regions/sectors to which the data is to be written.

The controller 112 (e.g., the FTL interface module) can perform logic-to-physical (L2P) operations based on the L2P table 122. For example, the controller 112 can translate a LBA into a physical address, thus resolving the physical address corresponding to the LBA. Responsive to receiving a write or read command (containing a LBA therein) from the host 130, the controller 112 (e.g., the FTL interface module) can look up the physical address corresponding to the LBA in order to write to or read from the physical address. Furthermore, the L2P table 122 can store status indicators indicating whether the data associated with a physical address and/or a logical address is uncorrectable in the manner described.

In some arrangements, the L2P table 122 may be stored in a designated location or address of the non-volatile storage 118, which may or may not be located in one of NAND flash memory devices 120a-120n. The L2P table 122 may be loaded to the volatile storage 116 or a suitable local memory of the controller 112 during a power-on operation. In some arrangements, the L2P table may be updated directly when processing inflight write commands. Alternatively an L2P log 123 can be written with update events. The L2P log 123 can be processed at a later more convenient time, or from time to time at intervals. The L2P log 123 may be created in the volatile storage 116 or a suitable local memory of the controller 112 during the processing of write commands received from the host 130. In the event of a power loss event, the L2P log 123 may be stored in a designated location or address of the non-volatile storage 118, which may or may not be located in one of NAND flash memory devices 120a-120n. During the processing of the inflight write commands during the processing of a power loss event, the L2P log events may be recorded directly in the L2P log 123 saved in the non-volatile storage 118. The L2P log 123 previously saved in the non-volatile storage 118 may be loaded to the volatile storage 116 or a suitable local memory of the controller 112 during a power-on operation.

The PLP capacitors 114 include suitable capacitors that can store energy when the power is on. The energy stored in the PLP capacitors 114 can be used as auxiliary power responsive to a power loss event to store information (e.g., the write command list) to the non-volatile storage 118 in the manner described. Examples of the PLP capacitors 114 include but are not limited to, supercapacitors, tantalum electrolytic capacitors, monolithic ceramic capacitors, and aluminum electrolytic capacitors.

While PLP capacitors 114 are used throughout as examples of auxiliary power, one of ordinary skill in the art can appreciate that any suitable auxiliary power source (e.g., a battery and another power source unit) can be likewise implemented.

In some arrangements, the volatile storage 116 may be a local memory of the controller 112. In some arrangements, the volatile storage 116 may be a memory device different from or in addition to the local memory of the controller 112. Examples of the volatile storage 116 include but are not limited to, Random Access Memory (RAM), Dynamic Random Access Memory (DRAM), and Static Random Access Memory (SRAM). The volatile storage 116 cannot store data without power.

In some arrangements, the power interface 124 includes any suitable interface (including pins, wires, connectors, transformers, and the like) that connects the SSD device 110 to a primary (regular) power supply. In some examples, the PLP capacitors 114 or another auxiliary power supply is used in response to the power interface 124 detecting that the power from the primary power supply is interrupted. In that regard, the power interface 124 may include suitable circuitry for detecting whether the primary power supply is interrupted and switching between primary power to backup power.

The host 130 accesses the SSD device 110, for example, by sending write and read commands to the SSD device 110. The host 130 can communicate with the SSD device 110 via a suitable interface such as but not limited to, a Universal Serial Bus (USB) interface, a Serial-Advanced Technology Attachment (SATA) interface, an Enhanced Small Disk Interface (ESDI), a Small Component Small Interface (SCSI), a Peripheral Component Interconnection (PCI) interface, an express Serial Attached SCSI (SAS), an Integrated Drive Electronics (IDE) interface, and a Non-Volatile Memory Express (NVMe) interface.

Figure 2A:
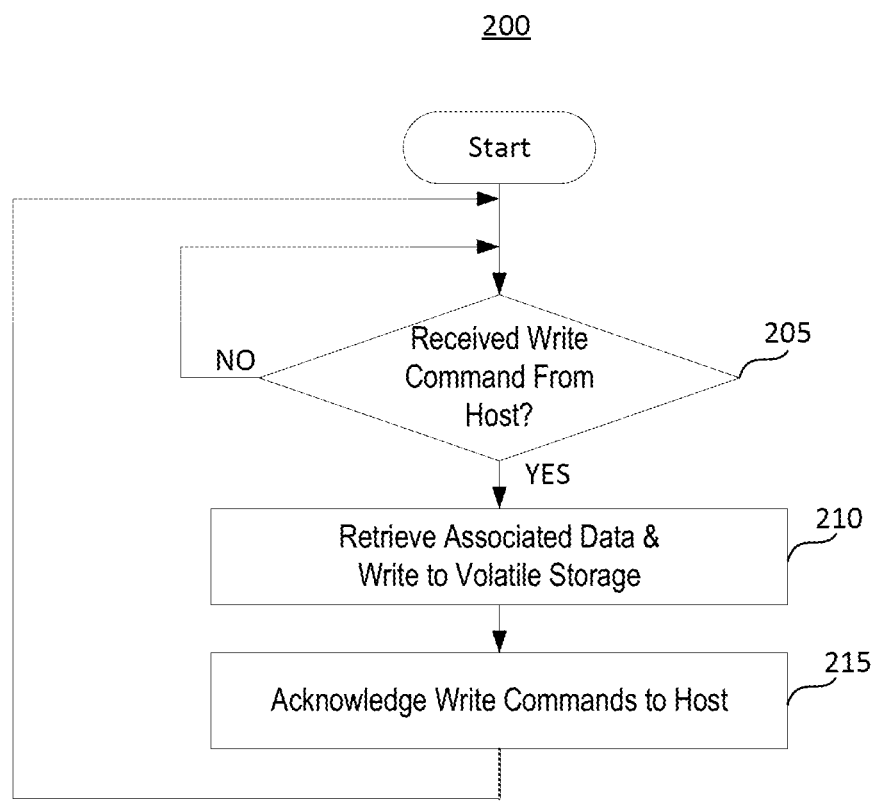
FIG. 2A shows a flow chart of a process for a SSD device to receive write commands, according to some implementations.

FIGS. 2*a-f* show flow charts of processes 200, 220, 240, 250, 260 and 280 for the SSD device 110 to manage data in response to a power loss event, according to some implementations. Referring to FIGS. 1-2*a*, the process 200 may be performed by the SSD device 110 for receiving write commands.

At 205 (205:YES), the SSD device 110 receives write commands and data associated therewith from the host 130. On the other hand, the SSD device 110 stands by with respect to write commands (205:NO) and returns to 205. At 210, the SSD device 110 retrieves data associated with the write commands and writes the data to the volatile storage 116. For example, the controller 112 is configured to write the data received from the host 130 to the volatile storage 116 or another suitable temporary buffer or cache of the SSD device 110. At 215, the SSD device 110 acknowledges the write commands to the host 130, for example, responsive to writing the data to the volatile storage 116 and returns to 205.

Figure 2B:
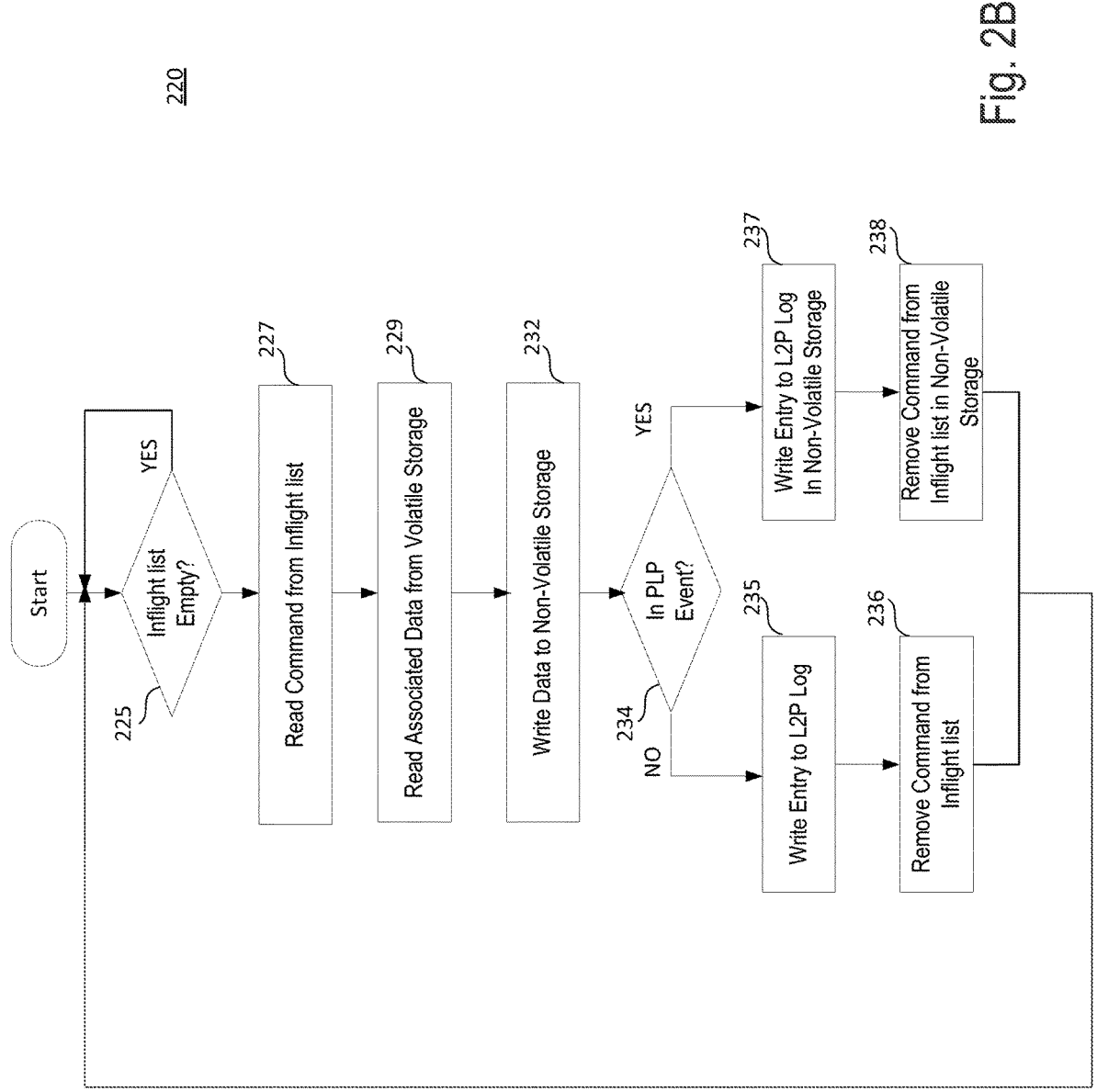
FIG. 2B shows a flow chart of a process for a SSD device to handle inflight commands, according to some implementations.

FIG. 2*b* shows the flow chart of a process 220 for the SSD device 110 to handle inflight write commands. At 225, the inflight list is checked for outstanding inflight write commands. Responsive to the controller 112 determining that the inflight command list is empty (225:YES), the process 220 returns to 225. On the other hand, responsive to the controller determining that the inflight command list is not empty (225:NO), at 227 a write command is read by the controller 112 from the inflight command list. At 229, data associated with the inflight write command is read from the volatile storage 116. At 232 the data is written by the controller 112 to the non-volatile storage 118. A check is made at 234 to determine if the controller 112 is currently processing a power loss event. Responsive to determining that the controller 112 is not currently processing a power loss event (234:NO), an entry is appended by the controller 112 to the L2P log 123 (in the volatile memory 116) to record the physical address of where the data was written corresponding to the logical address of the write commands. At 236 the write command is removed from the inflight write command list by the controller 112, and the process 220 returns to 225. Responsive to determining that the controller 112 is currently processing a power loss event (234:YES), the controller 112 appends an entry to the L2P log (in the non-volatile storage 118) to record the physical address of where the data was written corresponding to the logical address of the write command. At 236 the inflight write command is removed from the inflight list (in the non-volatile storage 118) and the process 220 returns to 225.

Figure 2C:
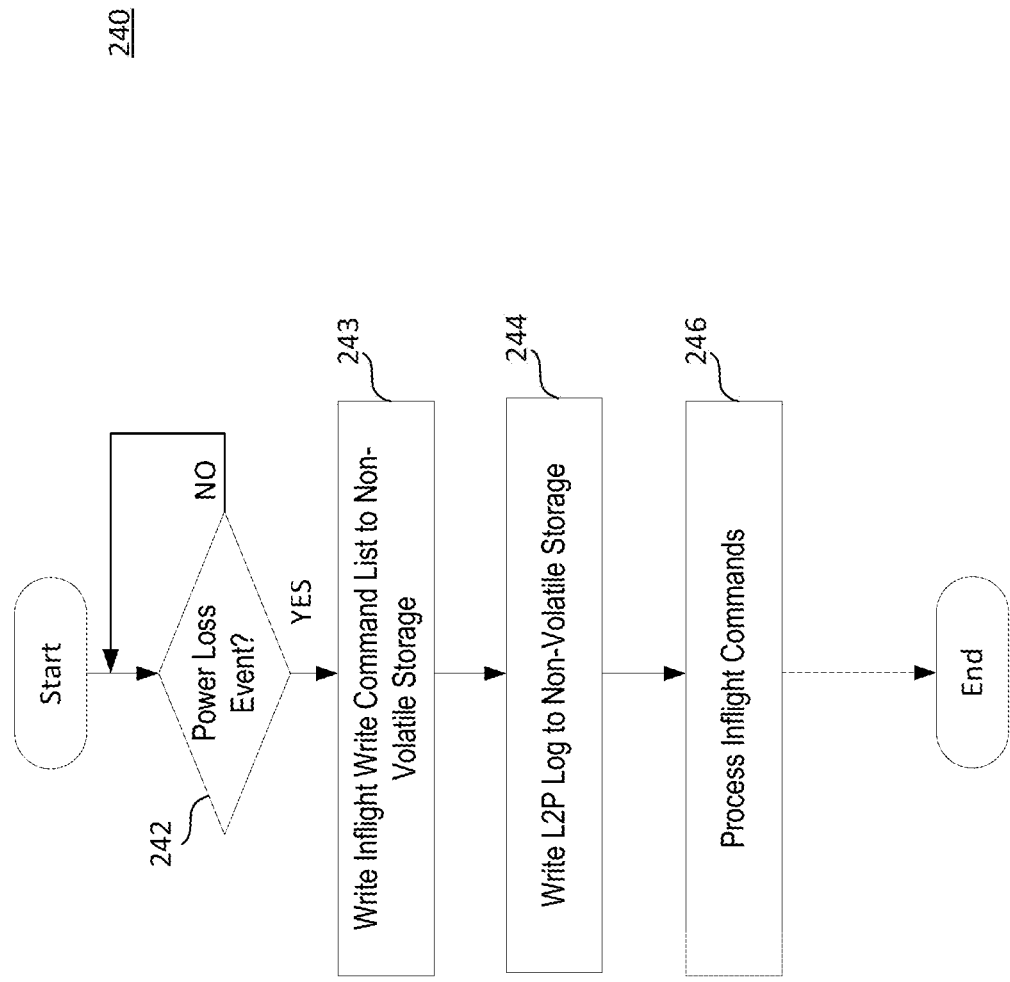
FIG. 2C shows a flow chart of a process for a SSD device to handle power loss events, according to some implementations.

FIG. 2*c* shows the flow chart of a process 240 for the SSD device 110 to handle power loss events. At 242, the SSD device 110 determines whether an unexpected power loss has been detected. For example, the power interface 124 can determine that the primary power source for the SSD device 110 is interrupted unexpectedly (e.g., without prior notifications) and notify the controller 112 that an unexpected power loss event has occurred.

While power loss has not been detected (242:NO), the process 240 remains at 242.

On the other hand, responsive to detecting power loss has occurred (242:YES), the controller 112 uses the energy stored in the PLP capacitors 114 to write the inflight write command list (but not the data associated with the inflight write command list) to the non-volatile storage 118 at 243. At 244, the L2P log 123 is written to the non-volatile storage 118. At 246, the controller 112 uses any remaining energy stored in the PLP capacitors 114 to begin processing the inflight write commands (in other words, the process 240 passes to the process 220. The controller 112 may or may not complete this processing. However, given the inflight write command list and L2P log 123 have been previously saved to the non-volatile storage 118 and each inflight write command is processed while a power loss event is occurring, changes to the inflight write command list and the L2P log 123 are saved to the non-volatile storage 118. In some arrangements, the inflight write commands list can be stored in a designated physical address or a designated portion (e.g., a specialized buffer) in the non-volatile storage 118. In this manner, even when the energy stored in the PLP capacitors 114 is depleted, the inflight write commands list can be saved by virtue of the fact that the list is stored in the non-volatile storage 118. In addition, as many inflight write commands as possible can be processed with any remaining energy, while still ensuring that the list of any inflight write commands not processed has been kept up-to-date in the non-volatile storage 118.

In some arrangements, the inflight data corresponding to the list of inflight write commands is not stored to the non-volatile storage 118 using the energy stored in the PLP capacitors 114 (i.e. step 246 is not performed), thus greatly reducing the number of the PLP capacitors 114 needed to address a power loss event. Accordingly, cost, space, and points of failure associated with the PLP capacitors 114 can be improved.

In other arrangements, after the infight write commands have been saved, a remainder of the energy stored in the PLP capacitors 114 may be used to store at least some of the inflight data to the non-volatile storage 118 by performing step 246. As much inflight data can be saved using the remainder of the energy stored in the PLP capacitors 114. Some of the inflight data can be saved in a designated physical address or a designated portion in the non-volatile storage 118.

In some arrangements, the controller 112 may determine an amount of data that is inflight in response to detecting the power loss event at 220. In response to determining that the amount of inflight data exceeds a predetermined threshold, the controller 112 may store only the list of inflight write commands (and not any inflight data) and the L2P log 123 in the non-volatile memory 118. On the other hand, in response to determining that the amount of inflight data is below the predetermined threshold, the controller 112 may store the list of inflight write commands, the L2P log 123 and at least a portion of all of the inflight data in the non-volatile memory 118.

Figure 2D:
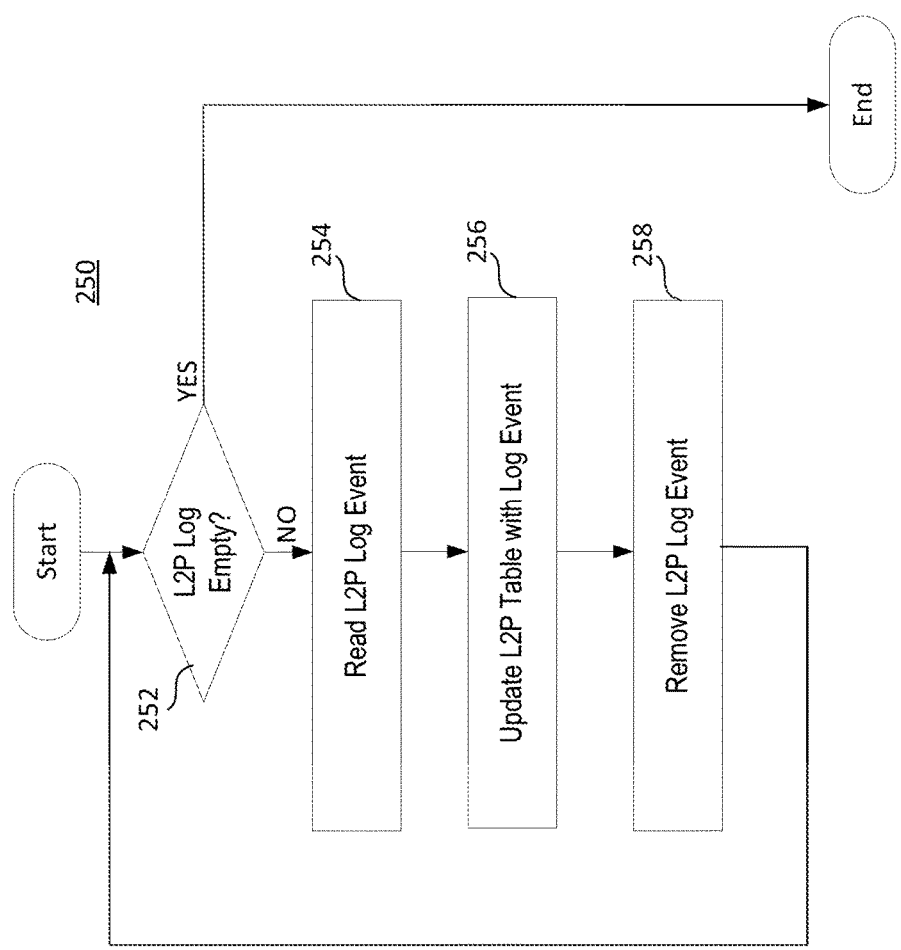
FIG. 2D shows a flow chart of a process for a SSD device to handle processing the L2P log, according to some implementations.

FIG. 2d shows the flow chart of a process 250 for the SSD device 110 to handle processing the L2P log 123, which may be performed from time to time after the processing of the inflight write commands or when recovering from a power loss event. At 252, responsive to the controller 112 determining that the L2P log 123 is empty (252:YES), then the process 250 ends. On the other hand, responsive to the controller 112 determining that the L2P log 123 not empty (252:NO), an L2P log event is read by the controller 112 at 254. At 256, the controller 112 updates the L2P table 122 (in the non-volatile storage 118 with a copy in the volatile storage 116). At 258 the controller 112 removes the event from the L2P log 123, and the process 250 returns to 252.

FIG. 2e shows the flow chart of a process 260 for the SSD device 110 to handle recovery from a power loss event. The process 250 starts with the power being restored (e.g., a power restoration event) in any suitable manner. At 262, the controller 112 reads the saved copy of the L2P table 122 from the non-volatile storage 118. At 264, the controller 112 reads the L2P log 123 from the non-volatile storage 118. At 266, the L2P log 123 is processed (i.e. the process 250 is performed at 266). Block 266 serves to update the L2P table 122 with the inflight write commands that had associated data saved in the non-volatile storage 118. At 268, the inflight write command list is read. This list contains the inflight write commands that did not have associated data saved in the non-volatile storage 118. The controller 112 marks locations of the non-volatile storage 118 (e.g., locations of the NAND flash memory devices 120a-120n) associated with the write commands (e.g., the inflight write commands stored at 230) as uncorrectable, at 270.

In the arrangements in which some of the inflight data is saved using the remainder of the energy in the PLP capacitors 114, the correct physical addresses in the L2P log event for inflight write commands would have been written to the non-volatile storage 118 with the remaining energy in the PLP capacitors 114 at 246. The L2P log events for those commands are handled in block 266, where the correct physical addresses in the L2P log events are written to the L2P table 122.

The controller 112 may mark the locations using the L2P table 122. FIG. 3 shows a schematic representation of a L2P table 300, according to some implementations. Referring to FIGS. 1-3, the L2P table 300 may be an example of the L2P table 122. The L2P table 300 may include logical addresses (e.g., in the logical address column), physical addresses (e.g., in the physical address column), and the correspondence thereof. In the schematic representation of the L2P table 300, a logical address and a physical address in a same row correspond to each other. For example, data corresponding to Logical Address A is physical stored at Physical Address A.

In addition, the L2P table 300 can further store a status indicator associated with each logical address and physical address. "Normal" indicates that the data corresponding to the logical address and physical address is valid. "Uncorrectable" indicates that the data corresponding to the logical address and physical address is invalid. As shown Logical Addresses A, C, E, F, and G contain uncorrectable data.

Figure 2F:
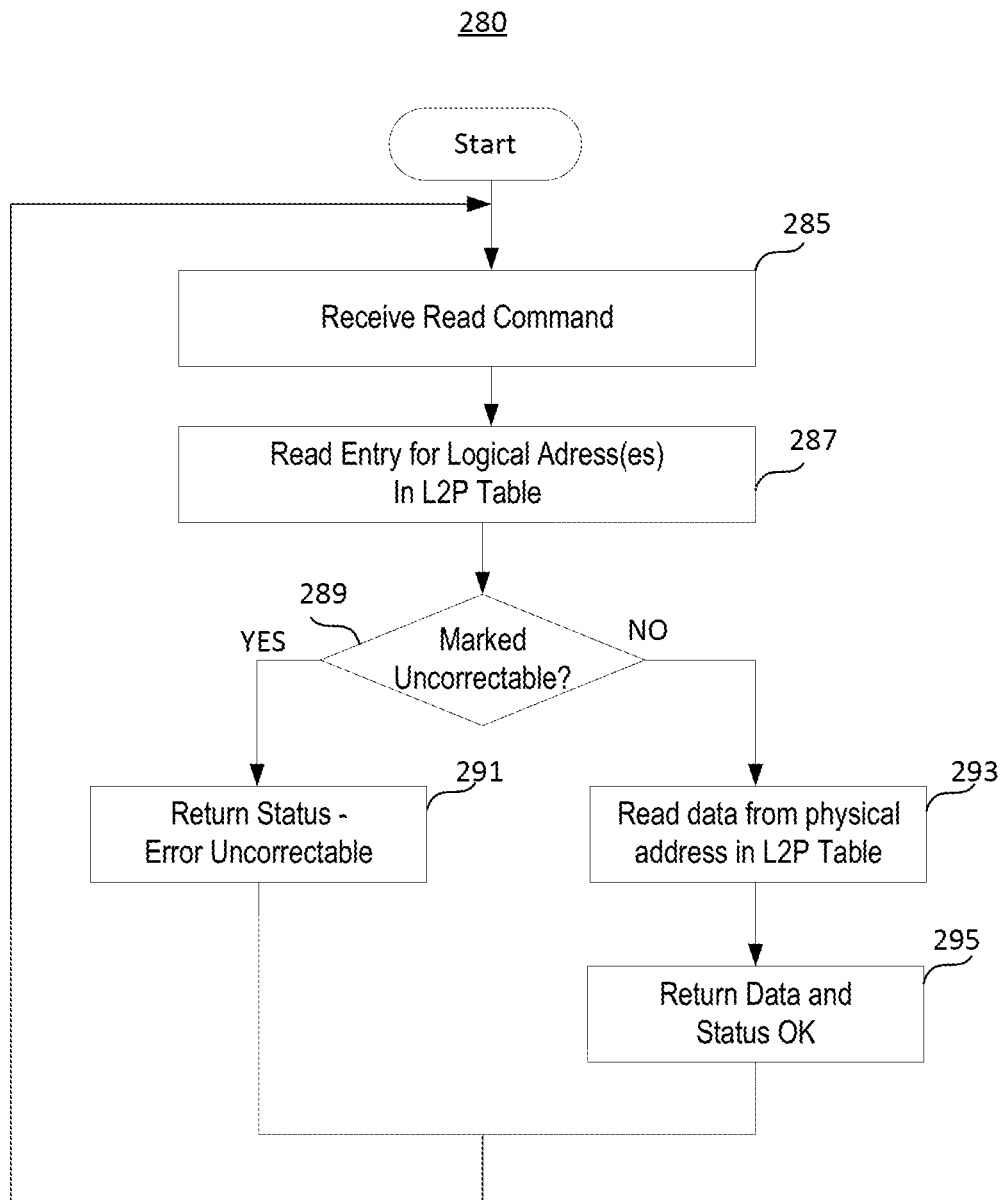
FIG. 2F shows a flow chart of a process for a SSD device to handle read commands from the host, according to some implementations.

FIG. 2f shows a flow chart of a process 280 for the SSD device 110 to handle read commands from the host 130. At 285, the SSD device 110 at some point may receive from the host 130 a read command. The read command may include one or more LBAs. The associated entries in the L2P table 300 are read by the controller 112 at 287. At 289, the controller 112 can determine whether the data associated with the read command is uncorrectable. For example, the controller 112 can perform a lookup or search on the L2P table 300 using the LBA as lookup or search criteria. A status indicator corresponding to the LBA can be determined using the L2P table 300. As disclosed herein, the status indicator indicates whether the data associated with the LBA is uncorrectable. Therefore, the controller 112 can determine that the data is uncorrectable. In some arrangements, instead of the controller 112, a dedicated hardware module can perform the function of block 289.

In response to determining that the data is uncorrectable (289:YES), the controller 112 sends a response to the host 130, indicating that the data associated with the read command is uncorrectable, at 291. For example, if the LBA is Logical Address A, the controller 112 can determine that the status of the data associated with Logical Address A is uncorrectable. Given that the same data can be saved in a different SSD device, a SSD device in a different rack or cabinet, or a SSD device in another SSD pool, the host 130 can request read of the same data from a different SSD device. As such, out-of-date data is not provided to the host 130, improving data integrity. Typically, data in a data center is saved in multiple locations for redundancy, for example in at least three different SSD devices, or saved using multiple SSD devices in a RAID configuration to provide data recovery in the event of unrecoverable data from one of the SSD devices. In addition, physical memory does not need to be rearranged following a power-up, as only the L2P table 300 is adjusted.

On the other hand, in response to determining that the data is not uncorrectable (289:NO), the controller 112 may be configured to provide the data corresponding to the read command to the host 130, at 295, having read the data stored at the location given in the L2P table 122 at 293. For example, if the LBA is Logical Address B, the controller 112 can determine that the status of the data associated with Logical Address B is normal.

In some arrangements, in response to the power being restored (e.g., the process 260), the controller 112 may provide the list of inflight write commands (read at 268) to the host 130. This allows the host 130 to identify any uncorrectable, lost write data. The host 130 can send the data to the SSD device 110 again, after copying that data by reading the data from another storage (e.g., another SSD device).

FIG. 4 shows a flow chart of a process 400 for the SSD device 110 to manage the writing of data, the response to a power loss event and the subsequent recovery when power is restored, according to some implementations. Referring to FIGS. 1-4, one or more of blocks 410-450 correspond to one or more of blocks 205-260. At 410, the SSD device 110 (e.g., the controller 112) receives, from the host 130, the write commands and data associated with the write commands. At 420, the SSD device 110 (e.g., the controller 112) writes the data to the volatile storage 116. At 430, the SSD device 110 detects the power loss event before the data is written to the non-volatile storage 118. At 440, the SSD device 110 stores the write commands (but not the associated data) to the non-volatile storage 118. After recovery from the power loss event, at 450, the SSD device 110 marks at least one storage location of the non-volatile storage 118 associated with the write commands as uncorrectable.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout the previous description that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

It is understood that the specific order or hierarchy of steps in the processes disclosed is an example of illustrative approaches. Based upon design preferences, it is understood that the specific order or hierarchy of steps in the processes may be rearranged while remaining within the scope of the previous description. The accompanying method claims present elements of the various steps in a sample order, and are not meant to be limited to the specific order or hierarchy presented.

The previous description of the disclosed implementations is provided to enable any person skilled in the art to make or use the disclosed subject matter. Various modifications to these implementations will be readily apparent to those skilled in the art, and the generic principles defined herein may be applied to other implementations without departing from the spirit or scope of the previous description. Thus, the previous description is not intended to be limited to the implementations shown herein but is to be accorded the widest scope consistent with the principles and novel features disclosed herein.

The various examples illustrated and described are provided merely as examples to illustrate various features of the claims. However, features shown and described with respect to any given example are not necessarily limited to the associated example and may be used or combined with other examples that are shown and described. Further, the claims are not intended to be limited by any one example.

The foregoing method descriptions and the process flow diagrams are provided merely as illustrative examples and are not intended to require or imply that the steps of various examples must be performed in the order presented. As will be appreciated by one of skill in the art the order of steps in the foregoing examples may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm steps described in connection with the examples disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The hardware used to implement the various illustrative logics, logical blocks, modules, and circuits described in connection with the examples disclosed herein may be implemented or performed with a general purpose processor, a DSP, an ASIC, an FPGA or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

In some exemplary examples, the functions described may be implemented in hardware, software, firmware, or any combination thereof. If implemented in software, the functions may be stored as one or more instructions or code on a computer-readable storage medium or processor-readable storage medium. The steps of a method or algorithm disclosed herein may be embodied in a processor-executable software module which may reside on a computer-readable or processor-readable storage medium. Computer-readable or processor-readable storage media may be any storage media that may be accessed by a computer or a processor. By way of example but not limitation, such computer-readable or processor-readable storage media may include RAM, ROM, EEPROM, FLASH memory, CD-ROM or other optical disk storage or magnetic disk storage that may be used to store desired program code in the form of instructions or data structures and that may be accessed by a computer. Disk and disc, as used herein, includes compact disc (CD), laser disc, optical disc, digital versatile disc (DVD), floppy disk, and blu-ray disc where disks usually reproduce data magnetically, while discs reproduce data optically with lasers.

Combinations of the above are also included within the scope of computer-readable and processor-readable media. Additionally, the operations of a method or algorithm may reside as one or any combination or set of codes and/or instructions on a processor-readable storage medium and/or computer-readable storage medium, which may be incorporated into a computer program product.

The preceding description of the disclosed examples is provided to enable any person skilled in the art to make or use the present disclosure. Various modifications to these examples will be readily apparent to those skilled in the art, and the generic principles defined herein may be applied to some examples without departing from the spirit or scope of the disclosure. Thus, the present disclosure is not intended to be limited to the examples shown herein but is to be accorded the widest scope consistent with the following claims and the principles and novel features disclosed herein.

What is claimed is:

1. A method for managing a Solid State Drive (SSD), the SSD comprising a connection to a primary power source, a backup power source, a volatile storage and a non-volatile storage, the method comprising:
   receiving, by the SSD, a write command and data associated with the write command; and
   in response to detecting, by the SSD, a shutdown of the primary power source before the data associated with the write command is copied from the volatile storage to the non-volatile storage of the SSD, and using the backup power source of the SSD:
   storing the write command to the non-volatile storage of the SSD; and
   marking at least one storage location of the non-volatile storage associated with the write command as uncorrectable.

2. The method of claim 1, further comprising:
   receiving, by the SSD, a read command for the data associated with the write command; and
   sending, by the SSD, a response indicating that data requested by the read command is uncorrectable.

3. The method of claim 1, wherein the at least one storage location is marked as uncorrectable via a Logical to Physical (L2P) mapping table.

4. The method of claim 3, wherein the L2P mapping table stores logical addresses, physical addresses associated with the logical addresses, and status indicators indicating whether data associated with the physical addresses and the logical addresses is uncorrectable.

5. The method of claim 4, further comprising:
   receiving, by the SSD, a read command comprising one of the logical addresses;
   looking up the one of the logical addresses in the L2P mapping table;
   determining, based on the status indicators in the L2P mapping table, that data associated with the one of the logical addresses is uncorrectable; and
   sending, by the SSD, a response indicating that the data associated with the one of the logical addresses is uncorrectable.

6. The method of claim 1, wherein the at least one storage location of the non-volatile storage is marked after a power restoration event.

7. The method of claim 1, further comprising:
   detecting a power restoration event after detecting the shutdown of the primary power source; and
   sending, by the SSD, the write command to an issuer of the write command.

8. The method of claim 1, wherein the backup power source comprises at least one Power-Loss-Protection (PLP) capacitor.

9. The method of claim 1, wherein the SSD refrains from storing the data associated with the write command after detecting the shutdown of the primary power source.

10. The method of claim 1, further comprising storing, by the SSD after detecting the shutdown of the primary power source, at least a portion of the data associated with the write command to the non-volatile storage after storing the write command.

11. The method of claim 10, wherein the at least portion of the data is stored using energy stored in the backup power source, wherein the energy comprises energy that remains after storing the write command.

12. The method of claim 1, further comprising acknowledging, by the SSD to a host, the write command responsive to writing the data to the volatile storage.

13. The method of claim 1, wherein the non-volatile storage is a plurality of NAND flash memory devices.

14. A Solid State Drive (SSD), comprising:
   a volatile memory;
   a non-volatile memory;
   a connection to a primary power source;
   a backup power source; and
   a controller configured to:
      identify a write command that is received before a shutdown of the primary power source occurs and before data associated with the write command is copied from the volatile memory of the SSD to the non-volatile memory of the SSD;
      store the write command to the non-volatile memory of the SSD; and
      mark at least one storage location of the non-volatile memory associated with the write command as uncorrectable.

15. A non-transitory computer-readable medium storing computer-readable instructions, such that when executed, causes a controller of a Solid State Drive (SSD) to:
   identify a write command that is received before a shutdown of a primary power source of the SSD occurs and before data associated with the write command is copied from a volatile storage of the SSD to a non-volatile storage of the SSD;
   store the write command to the non-volatile storage of the SSD; and
   mark at least one storage location of the non-volatile storage associated with the write command as uncorrectable.

16. The non-transitory computer-readable medium of claim 15, wherein the controller is further caused to:
   receive a read command for the data associated with the write command; and
   send, to a host, a response indicating that data requested by the read command is uncorrectable.

17. The non-transitory computer-readable medium of claim 15, wherein the controller marks the at least one storage location via a Logical to Physical (L2P) mapping table.

18. The non-transitory computer-readable medium of claim 17, wherein the L2P mapping table stores logical addresses, physical addresses associated with the logical addresses, and status indicators indicating whether data associated with the physical addresses and the logical addresses is uncorrectable.

19. The non-transitory computer-readable medium of claim 18, wherein the controller is further caused to:

receive a read command comprising one of the logical addresses;

look up the one of the logical addresses in the L2P mapping table;

determine, based on the status indicators in the L2P mapping table, that data associated with the one of the logical addresses is uncorrectable; and send, to a host, a response indicating that the data associated with the one of the logical addresses is uncorrectable.

20. The non-transitory computer-readable medium of claim 15, wherein the SSD further comprises a backup power source, wherein the write command is stored using energy from the backup power source, the backup power source comprising at least one Power-Loss-Protection (PLP) capacitor.

* * * * *